Patented Sept. 9, 1952

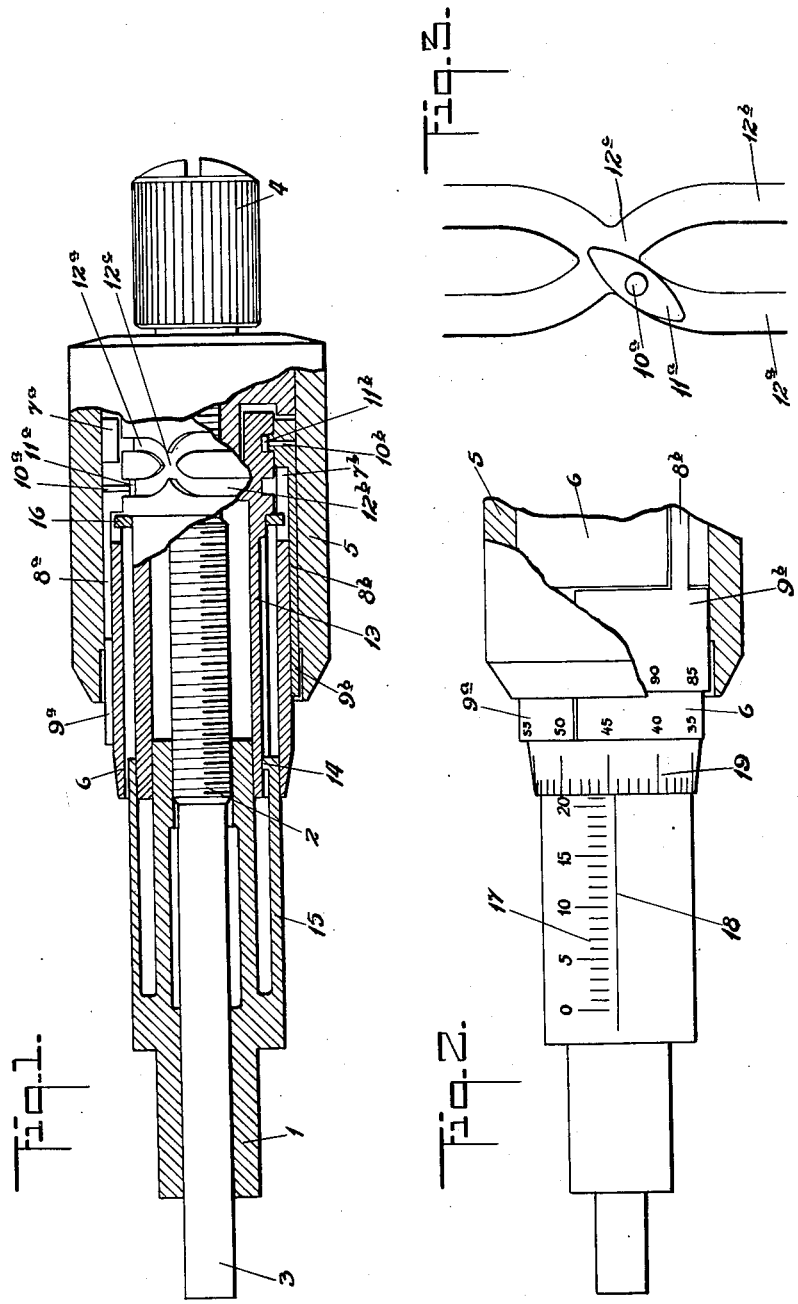

2,609,607

UNITED STATES PATENT OFFICE 2,609,607

MICROMETER

Wilhelm Rinker, Otto Sanger, and Ernst Leitz, Jr., Wetzlar, Germany, assignors to Ernst Leitz, G. m. b. H., Wetzlar, Germany, a German corporation Application March 24, 1949, Serial No. 83,136
In Germany October 1, 1948

5 Claims. (Cl. 33—164)

This invention relates to precision measuring instruments, and more particularly to instruments of the type generally known as micrometers. More specifically, the present invention is concerned with an improved arrangement of the measuring scales on micrometer calipers, micrometer caliper heads and like devices.

The pitch of the spindle screw threads of some of the micrometers generally in use heretofore is such that the spindle moves longitudinally only one half of one millimeter for one full revolution of the spindle. Such an instrument may be used for measuring lengths to an accuracy of one hundredth of one millimeter (0.000394 inch) by the provision of the appropriate graduation upon the beveled edge of the thimble which conventionally carries the desired number of subdivisions. The beveled edge of the thimble will be sub-divided into 50 units, each unit representing one fiftieth of one half millimeter, or one hundredth of one millimeter. The horizontal measuring line on the micrometer sleeve is subdivided by vertical marks into units of one millimeter each. One full revolution of the spindle will move the edge of the thimble one half millimeter along the horizontal measuring line, or half way between two vertical marks. If the spindle is turned less than one full revolution, the number of the thimble which coincides with the horizontal line on the sleeve indicates the number of hundredths of millimeters from the last number of full millimeters shown on the sleeve, if, however, the spindle is turned more than one full revolution but less than two revolutions, the first 50 units of a full revolution must be added to the number on the thimble which coincides with the horizontal line on the sleeve in order to arrive at the number of hundredths of millimeters from the last number of full millimeters shown on the sleeve. In such an arrangement it is, therefore, necessary to refer back to the horizontal graduation scale on the sleeve to find out whether the number shown on the thimble is in the first or second unit (first or second half) of fifties. If the horizontal graduation line shows that the edge of the thimble is removed more than half the distance from the last millimeter, then it is necessary to add 50 to the number shown on the thimble in order to arrive at the correct number of hundredths. Under these circumstances and in view of the exceedingly small distances involved, it is obvious that wrong measurements may ensue, particularly since these instruments are frequently used for series measurements and tiring of the eye and of the mind is a common occurrence.

It is an object of the present invention to overcome the above and other disadvantages of known micrometers.

It is another object of this invention to provide a micrometer which enables the user to determine or measure minute dimensions with a minimum of eye-strain and a maximum of accuracy.

It is a further object of the invention to enable the user to ascertain precise and accurate readings of the measuring scale of micrometers with a rapidity hitherto unobtainable.

Other objects and advantageous features of this invention will evolve from the following description of one embodiment thereof, which is shown by way of example only and is not intended to limit the scope of the invention. In the accompanying drawing Fig. 1 represents a micrometer caliper head with two movable slides, partly in longitudinal section and partly in elevation;

Fig. 2 shows the same micrometer, with a view of the measuring scales; and

Fig. 3 shows the specific distributing valve motion mechanism, suitably enlarged.

The above and other objects and advantages of the present invention may be achieved by providing a micrometer device having reciprocating slide or sleeve members over the thimble of the micrometer which, upon rotation of the thimble, are actuated in such a manner that they enter into and withdraw from the reader's field of view and, alternately, cover and uncover the numbers on the beveled edge of the thimble. The slide members or sleeves are provided with numbers which complement the numbers on the thimble so that, when a slide member is actuated and covers a number on the thimble, the number on the slide shows the actual number of sub-divisions and there is no necessity to refer back to the horizontal measuring line to establish whether the numbers on the thimble indicate the first or second full revolution. For instance, where the numbers on the thimble run from zero to fifty and two reciprocating slides are provided, one of said slides may carry numbers 50 to 70 while the other slide carries numbers 75 to 95. During the first full revolution of the spindle and thimble, at least one of the slides will remain retracted and hidden from view. As the second revolution begins, one slide will advance and cover the figures zero to twenty on the thimble, showing instead figures 50 to 70, which are the correct numbers of hundredths of millimeters from the last vertical mark of the horizontal measuring line. As the second revolution progresses further, the first slide may retract and the second slide will reciprocatingly advance, covering numbers 25 to 45 on the thimble and showing the correct numbers 75 to 95. These movements will be repeated continuously, as the spindle and thimble are turned.

The reciprocating slides may be so actuated that their numbers appear side by side with the numbers on the thimble but it is preferred that the numbers on the thimble be completely hidden from view upon actuation of the slides. It is also within the scope of the invention to arrange the actuating means so that the thimble is retracted rather than to advance the slides. Also, instead of providing the above two slides, a reciprocating ring may be provided, such a ring carrying the complementary numbers of the thimble and covering all numbers of the thimble during the second revolution. Any number of retractable slides may be employed and each tenth unit indicator may, for instance, be alternately covered and uncovered by a tenth unit indicator on the slide.

Having reference now to the specific embodiment of the present invention shown in the drawings, there is shown a micrometer head comprising a fixed cylindrical sleeve 1 carrying the screw head 2, and the measuring spindle 3 which is rotatably displaceable by turning the knurled knob 4. Protective housing 5 and a thimble 6 are rigidly attached to knob 4. Guide grooves 7a and 7b for the slides 8a and 8b are provided in the interior of the thimble. The outer ends of the slides are formed as cylinder segments 9a and 9b, the complementary number of notations being carried by said segments. Sliding blocks 11a and 11b, rotatable around the axes 10a and 10b, are provided at the inner ends of the reciprocating slides 8a and 8b, said blocks being adapted to glide in guide paths 12a and 12b formed by an endless groove on the sleeve 13. Sleeve 13 is moved parallel to fixed sleeve 1 during the longitudinal advance of spindle 3 but is held against rotational displacement by protuberance 14 of outer cylinder 15 which engages a groove 13a in sleeve 13. The two guiding grooves 12a and 12b merge reciprocally at 12c.

Outer cylinder 15 carries the horizontal measuring scale 17 and the reading (zero) line 18. The sub-division 19 is provided upon beveled edge of the thimble 6, carrying the numbers 0–50. Numbers 50–70 and 75–95 are provided upon the edges of slides 9a and 9b, respectively.

The operation of the micrometer shown in the drawing is as follows: Cylindrical sleeve 1 is held in fixed position while knob 4 is turned, whereby screw head 2 carrying measuring spindle 3 is rotated into or out of the sleeve 1 which is provided with threads corresponding to those of screw head 2. Thimble 6 is fixedly connected to knob 4 and the protective housing 5 is attached to and covers part of the thimble. Therefore, the thimble and the protective housing are moved axially together, with screw head 2 when knob 4 is turned. Sleeve 13 is held in operative connection with thimble 6 by means of spring-controlled ring 16 attached to the thimble. Therefore, sleeve 13 moves axially into or out of annular channel 20 provided in outer cylinder 15 when the knob 4 is turned, but it is held against rotational displacement by protuberance 14 fitting into longitudinal groove 13a of the sleeve. Thimble 6 is provided with guide grooves 7a, 7b for the slides 8a, 8b, whereby the slides are axially movable on the thimble. The slides are formed at their outer ends as cylindrical segments 9a, 9b and, at their inner ends, they carry sliding blocks 11a, 11b which are rotatable around their respective axes 10a, 10b and are adapted to engage grooves 12a, 12b provided at the inner end of sleeve 13. The slides, being held against rotational displacement in respect to thimble 6 by grooves 7a, 7b, are rotated together with the thimble when knob 4 is turned. Since, as previously explained, sleeve 13 does not rotate with the thimble, the sliding blocks 11a, 11b are forced to follow the course of grooves 12a, 12b when the knob and thimble are rotated, whereby one slide is automatically pushed forward while the other is retracted, and segments 9a, 9b are either withdrawn beyond the protective housing 5 or are in a position to cover the numerals 19a of the thimble by the numerals 19b of the respective slide. In this arrangement, thimble 6 carries numerals 19a from 0 to 45, segment 9a carries numerals 50 to 70, and segment 9b carries numerals 75 to 95. To read the measurement, it is only necessary to look upon the horizontal measuring scale to read the full number of millimeters and read from the thimble or slide (whichever shows) the number of hundredths of millimeters, which must be added to the number of full millimeters.

Various adaptations and modifications of our invention are envisaged, such as the use of other than metric scales, and it is to be understood that our description and drawings are intended to show only one example of the invention, the scope of which is limited only by the appended claims.

What is claimed is:

1. In a micrometer comprising a fixed sleeve member, a revolvable spindle member threaded therein, a first measuring scale carried by the fixed sleeve member, and a thimble revolvable together with the spindle member and carrying a second measuring scale adapted to show subdivisions of the units shown upon the first measuring scale, at least one slide member and guide means therefor in the interior of the thimble, said guide means being adapted to advance and retract said slide member during revolution of the spindle and the thimble.

2. A micrometer comprising, in combination, a sleeve member; a revolvable spindle member threaded into the sleeve member, a first measuring scale upon said sleeve member, a thimble revolvable together with the spindle member, a second measuring scale carried on said thimble, said first measuring scale showing the main units of the micrometer, and said second measuring scale on the thimble showing sub-divisions of said main units, means for moving said thimble longitudinally only part of the distance of a main unit in one revolution whereby the sub-divisional units on the thimble, during the second revolution of the thimble, indicate only a part of the sub-divisional units from the last main unit shown on the first measuring scale, and at least one slide member and guide means therefor in the interior of the thimble, said guide means being adapted to advance said slide member during said second revolution to cover at least part of the second measuring scale on the thimble and to show sub-divisional unit indicators complementary to those on the thimble measuring scale and giving the exact number of sub-divisional units from the last main unit shown on the first measuring scale.

3. A micrometer comprising, in combination, a fixed sleeve member, a revolvable spindle member threadably displaceable in said fixed member, a thimble adapted to be rotated together with the spindle, a first measuring scale on the sleeve member showing the main measuring units of the micrometer, a second measuring scale on the thimble showing sub-divisions of said main units; and at least one slide member and guide means therefor in the interior of the thimble, said guide means being adapted to advance and retract said slide member automatically during revolution of the spindle and the thimble, said guide means comprising a reciprocal motion mechanism consisting of two reciprocally intersecting guide grooves provided on a sleeve which is interposed between the spindle and the thimble, said guide grooves being adapted to carry sliding blocks attached to each of said slide members.

4. A micrometer comprising, in combination, a fixed sleeve member comprising an inner and an outer cylinder, a revolvable spindle member adapted to be threaded into the inner cylinder of the said sleeve member, a thimble adapted to fit over the outer cylinder of the said sleeve member and being rotatable together with the spindle, a cylindrical sleeve member adapted to slide between the inner and the outer cylinder of said fixed sleeve member parallel to its axis, reciprocally intersecting guide grooves on the outer surface of said last-named cylindrical sleeve near its inner extremity, and at least one slide member over said thimble, each slide member being provided with a sliding block, said guide grooves and sliding blocks forming a reciprocal motion mechanism adapted automatically to advance and retract each slide member by revolving the rotatable parts of the micrometer.

5. A combination as claimed in claim 4 wherein said outer cylinder of the fixed spindle member carries a first measuring scale showing the main measuring units of the micrometer, said thimble carrying a second measuring scale showing sub-divisions of said main units, said thimble moving longitudinally only part of the distance of one of said main units in one revolution whereby the sub-divisional units on the thimble, during a second revolution of the thimble, indicate only a part of the sub-divisional units from the last main unit shown on the first measuring scale, said slide members carrying sub-divisional unit indicators complementary to those on the thimble and covering them during said second revolution thereby giving the exact number of sub-divisional units from the last main unit shown on the first measuring scale.

W. RINKER.
OTTO SANGER.
ERNST LEITZ, Jr.

REFERENCES CITED

The following references are of record in the file of this patent:

UNITED STATES PATENTS

| Number | Name | Date |
| --- | --- | --- |
| 990,655 | Jaques | Apr. 25, 1911 |

FOREIGN PATENTS

| Number | Country | Date |
| --- | --- | --- |
| 65,551 | Austria | July 10, 1914 |